R. STICKDORN.
DEVICE FOR PREVENTING THE RETURN OF WASTE WATER INTO WATER SUPPLY PIPES.
APPLICATION FILED NOV. 3, 1908.

926,968.

Patented July 6, 1909.

Witnesses:
W. R. Schulz.
Edw. Schorr.

Inventor:
Robert Stickdorn
by his attorney

UNITED STATES PATENT OFFICE.

ROBERT STICKDORN, OF DUSSELDORF, GERMANY.

DEVICE FOR PREVENTING THE RETURN OF WASTE WATER INTO WATER-SUPPLY PIPES.

No. 926,968.

Specification of Letters Patent.

Patented July 6, 1909.

Application filed November 3, 1908. Serial No. 460,890.

*To all whom it may concern:*

Be it known that I, ROBERT STICKDORN, a citizen of the German Empire, residing at Lindenstrasse No. 251, Dusseldorf, in the Province of Rhineland and Kingdom of Prussia, Germany, have invented new and useful Improvements in Devices for Preventing the Return of Waste Water into Water-Supply Pipes, of which the following is a specification.

The present invention relates to a contrivance, guarding the house water-pipings against return-suction of refuse-water from tanks or similar receptacles connected with tapping-devices and securing the flowing out of the water from the conduits in pure condition.

In order that the invention may be more clearly understood, reference is made to the accompanying drawings, in which similar numerals refer to similar parts throughout the several views.

Figure 1:
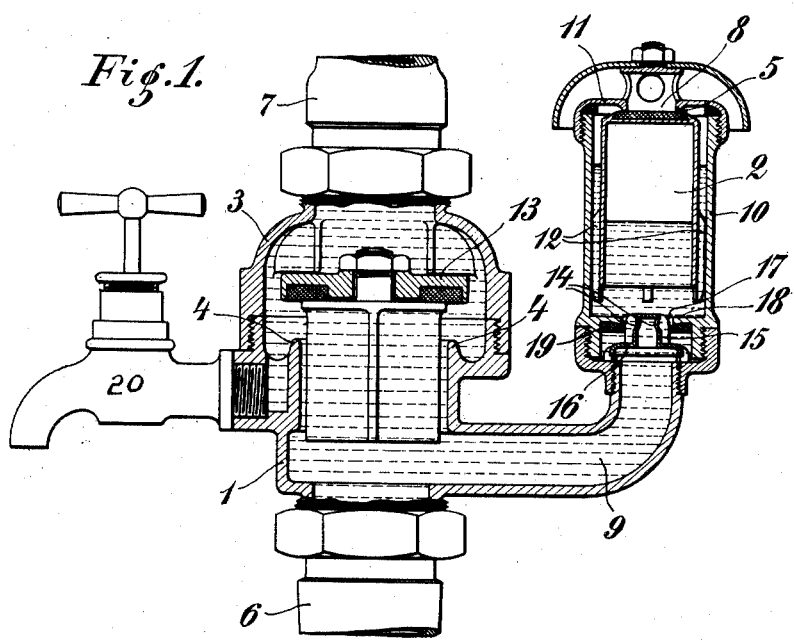
Figure 2:
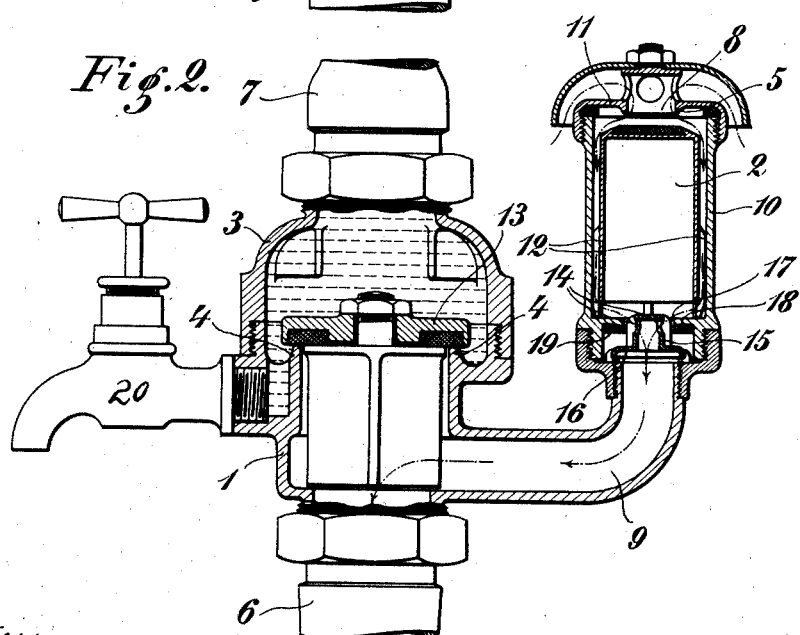

The two views represent two longitudinal sections of the object of the invention and Figure 1 is a valve, when under hydraulic pressure. Fig. 2 shows the valve when the evacuation of the piping takes place.

The air-supply 9 discharges into the valve-chamber formed by two pieces 1 and 3 adapted to be dismounted, section 1, being provided with a discharge faucet 20. The air-supply itself is likewise connected with the valve-chamber 10, the latter being provided with an opening 8 protected against the falling-in of mud by means of a hood. The closing-member 2, arranged in the chamber 10 so that it can be lifted, is shaped in form of a bell and its upper surface is adapted for establishing a tight closure in combination with the valve-seat 5. The valve-disk carries guides 12 having at their bottom end the form of short feet. When the water is rising in the water conduit-pipe it ejects the air therein contained and the latter can without further ado pass upwardly underneath and along the sides of the valve-disk 2 and thereupon escape through the opening 8 of the lid 11. If, however, the water is finally taken to the chamber, it rises in this and closes the hollow room of the bell-shaped valve-disk 2 at its bottom, in such way that the air it contains remains therein. Now the water produces a powerful lifting effect on the closing-member, by which means it bears tightly against the seat 5, before the water entirely fills the chamber 10.

Below the bell-shaped valve-disk 2 a second or auxiliary valve-disk 15 provided with openings 14 and also shaped in form of a bell, is arranged, acting in such a manner, that, while a discharge of water takes place, it allows the water contained in the valve-chamber and the valve to flow out without check and also allows the air entering at the top into the chamber to pass in sufficient quantity into the piping, in order that no water from branch-conduits can be sucked up; on the other hand, when the water is permitted again to enter, it allows only of a slow admission of the air and of the water into the valve-chamber and into the valve, preventing it in this way from being closed too early.

The member 15, placed below the bell 2 provided with the valve closing-device 5, is perforated at its upper end and provided with an edge 16. The hollow member 15 passes outwardly through an opening 17 of a disk or bottom 18 respectively, arranged below the valve-closure and covered at the bottom with a packing-disk 19. If, on admitting water, this enters quickly into the piping, so as to eject instantaneously the air, the latter immediately lifts the bottom-bell-shaped member 15, whereupon its edge 16 is placed against the disk 19, in order that the air may enter slowly through the openings 14 into the valve chamber from which it emanates by means of the opening 8. The air entering slowly into the valve chamber and into the valve cannot lift the bell 2; it is rather—as required—not lifted before the water rises to such a level, that it partly fills the chamber. When the piping is filled with water and the valve is closed the member 15 lowers again and on discharge of the water from the piping the air can enter in sufficient quantity through the valve seats so as to retain no water in the piping and to prevent the water contained in the branch-conduits from being sucked up.

The valve chamber 1, 3 is inserted into the water-piping in such a manner, that the water enters at its bottom and flows out at its top. The valve closing member 13 rests with its packing disk on the seat 4. When the inlet-piping is not interrupted such member is lifted by the water flowing out and at the upper end it bears against supports not preventing the passage of the water; on the other hand, owing to the hydraulic pressure, and to the air, contained in the bell-shaped valve disk 2 the latter is pressed against the seat and does not allow the water to run out. If now, however, the piping is turned off and evacuated, the valve-disk 13 is pressed down by means of the water column resting on it, and likewise the valve-disk 2 falls and the air-piping is opened. The water conduit pipe 7 above the valve 13 is consequently closed, but a sufficient quantity of air is allowed to enter into the piping.

It will be seen that the device above described provides means for simultaneously admitting air to the discharge faucet when tapping water therefrom, so that any undue suction in the various branches communicating with the water supply pipe is prevented.

I claim:—

1. In a device of the character described, a water supply pipe, a water conduit pipe, a first valve casing intermediate said pipes and having a discharge faucet, a valve disk inclosed within the casing and controlling communication between the pipes, a second valve casing communicating with the first valve casing below said valve disk and having an upper air opening, a float valve within said second casing and adapted to close said opening, and an auxiliary valve intermediate the first and second valve casings.

2. In a device of the character described, a water supply pipe, a first valve casing communicating therewith, a valve disk inclosed within said first casing, a second valve casing communicating with said first casing and having an upper air opening, a first bell-shaped valve having feet and adapted to close said air opening, and a second bell-shaped valve adapted to control communication between said first bell-shaped valve and the first valve casing.

ROBERT STICKDORN.

Witnesses:
 LOUIS VANDORN,
 BESSIE F. DUNLAP.